United States Patent
La Forest et al.

(10) Patent No.: US 8,444,893 B2
(45) Date of Patent: May 21, 2013

(54) FORMING CARBON-CARBON COMPOSITE PREFORMS USING MOLTEN PITCH AND CARBON FIBER FILAMENTS

(75) Inventors: Mark L. La Forest, Granger, IN (US); Slawomir Fryska, Granger, IN (US); David M. Wright, Springfield, MA (US)

(73) Assignee: Honeywell International Inc., Morristown, NJ (US)

( * ) Notice: Subject to any disclaimer, the term of this patent is extended or adjusted under 35 U.S.C. 154(b) by 48 days.

(21) Appl. No.: 13/226,260

(22) Filed: Sep. 6, 2011

(65) Prior Publication Data

US 2013/0056895 A1  Mar. 7, 2013

(51) Int. Cl.
*C01B 31/00*  (2006.01)

(52) U.S. Cl.
USPC ........... 264/115; 264/29.1; 428/367; 428/408

(58) Field of Classification Search
None
See application file for complete search history.

(56) References Cited

U.S. PATENT DOCUMENTS

| | | | |
|---|---|---|---|
| 5,202,293 A | 4/1993 | Okamoto et al. | |
| 5,382,392 A | 1/1995 | Prevorsek et al. | |
| 5,556,704 A | 9/1996 | Prevorsek et al. | |
| 5,578,255 A | 11/1996 | Okuyama et al. | |
| 5,871,844 A * | 2/1999 | Theys et al. | 428/367 |
| 6,521,152 B1 | 2/2003 | Wood et al. | |
| 7,234,571 B2 | 6/2007 | Wood et al. | |
| 7,441,635 B2 | 10/2008 | Rosenlocher et al. | |
| 7,700,181 B2 | 4/2010 | Goller et al. | |
| 2005/0184413 A1* | 8/2005 | Forest et al. | 264/29.1 |
| 2007/0132126 A1 | 6/2007 | Shao et al. | |

FOREIGN PATENT DOCUMENTS

EP  0 603 765 A1  6/1994

OTHER PUBLICATIONS

Kumar et al., "Effect of Fiber Length and Composition on Mechanical Properties of Carbon Fiber-Reinforced Polybenzoxazine," Polymers for Advanced Technologies, vol. 19, 2008, pp. 895-904.
European Search Report for EP Application No. 12182494.0, dated Dec. 12, 2012, 3 pages.
Examination Report from counterpart EP Application No. 12182494.0, mailed Feb. 4, 2013, 4 pages.

* cited by examiner

*Primary Examiner* — Mary F Theisen
(74) *Attorney, Agent, or Firm* — Shumaker & Sieffert, P.A.

(57) ABSTRACT

In one example, a method includes defibrillating at least one carbon fiber to form a plurality of carbon fiber filaments, melting pitch to form molten pitch, and mixing the plurality of carbon fiber filaments and the molten pitch to form a substantially homogeneous mixture of carbon fiber filaments. In another example, a method includes mixing a plurality of carbon fiber filaments having a length between about 6.35 millimeters and about 50.8 millimeters in molten pitch to form a substantially homogeneous mixture of carbon fiber filaments within the molten pitch, wherein mixing the plurality of carbon fiber filaments does not substantially change an average length of the plurality of carbon fiber filaments.

20 Claims, 2 Drawing Sheets

US 8,444,893 B2

FORMING CARBON-CARBON COMPOSITE PREFORMS USING MOLTEN PITCH AND CARBON FIBER FILAMENTS

TECHNICAL FIELD

The disclosure relates to carbon-carbon composite preforms.

BACKGROUND

Carbon fiber-reinforced carbon materials, also referred to as carbon-carbon (C—C) composite materials, are composite materials that generally include carbon fibers reinforced in a matrix of carbon material. The C—C composite materials can be used in many high temperature applications. For example, the aerospace industry employs C—C composite materials for manufacturing different aircraft structural components. Example applications include rocket nozzles, nose cones, and friction materials for commercial and military aircraft, such as brake friction materials.

SUMMARY

In general, the disclosure is directed to forming carbon-carbon composite preforms via a method that includes mixing a plurality of carbon fiber filaments in molten pitch. In some examples, mixing the plurality of carbon fiber filaments in the molten pitch causes a substantially homogeneous mixture of carbon fiber filaments and molten pitch to form, in which the plurality of carbon fiber filaments are oriented substantially randomly within the molten pitch. In some examples, mixing the plurality of carbon fiber filaments in the molten pitch is performed in a mixer that mixes the mixture without substantially changing an average length of the plurality of carbon fiber filaments (compared to prior to the mixing).

In one aspect, the disclosure is directed to a method that includes defibrillating at least one carbon fiber to form a plurality of carbon fiber filaments, melting pitch to form molten pitch, and mixing the plurality of carbon fiber filaments and the molten pitch to form a substantially homogeneous mixture of carbon fiber filaments.

In another aspect, the disclosure is directed to a method that includes mixing a plurality of carbon fiber filaments having a length between about 6.35 millimeters and about 50.8 millimeters in molten pitch to form a substantially homogeneous mixture of carbon fiber filaments within the molten pitch. According to this aspect of the disclosure, mixing the plurality of carbon fiber filaments does not substantially change an average length of the plurality of carbon fiber filaments.

In an additional aspect, the disclosure is directed to a system that includes a mold and a substantially homogeneous mixture disposed in the mold. According to this aspect of the disclosure, the substantially homogeneous mixture includes molten pitch and a plurality of substantially fully defibrillated carbon fiber filaments.

The details of one or more examples are set forth in the accompanying drawings and the description below. Other features, objects, and advantages of the disclosure will be apparent from the description and drawings, and from the claims.

DETAILED DESCRIPTION

Figure 1:
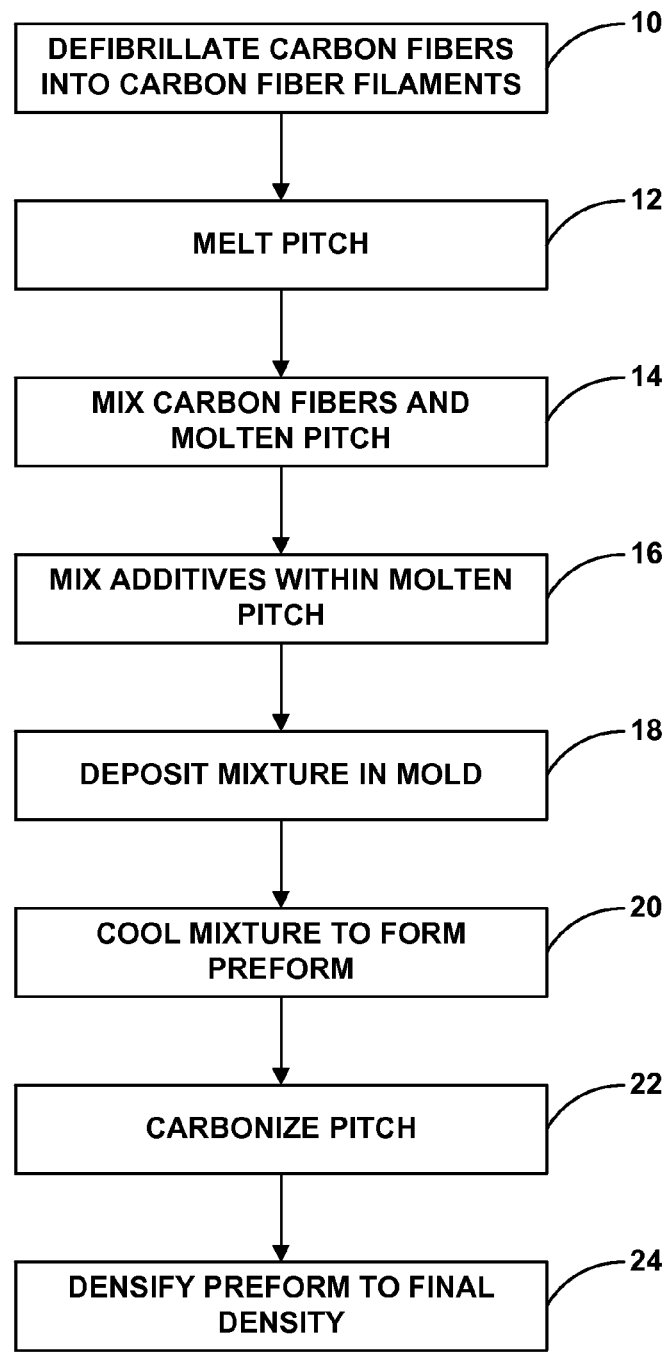
FIG. 1 is a flow diagram illustrating an example method of forming a carbon-carbon composite preform in accordance with aspects of this disclosure.

In general, the disclosure is directed to methods for forming a carbon-carbon composite preform.

In some cases, a carbonized preform is formed by needling together a plurality of sections of carbon fiber precursor material, such as polyacrylonitrile (PAN) or rayon, and carbonizing the carbon fiber precursor material to form a carbonized preform. The carbonized preform then is subjected to a plurality of densification steps to form a friction material. For example, the carbonized preform may be densified with liquid pitch using vacuum pressure infiltration (VPI) and/or resin transfer molding (RTM) and/or may be densified with carbonaceous material using chemical vapor deposition (CVD)/chemical vapor infiltration (CVI). Each of these steps can be time consuming and expensive, resulting in a friction material that is expensive and time consuming to manufacture.

In accordance with aspects of this disclosure, methods of forming a carbon-carbon composite preform (in contrast to a carbonized preform described above) are described. The methods generally include mixing a plurality of carbon fiber filaments with molten pitch. In some examples, after mixing, substantially none (e.g., none or less than about 10%, such as between about 5% and about 10%) of the plurality of carbon fiber filaments are present in the mixture in a bundle of filaments (i.e., the carbon fiber filaments are substantially fully defibrillated). In some implementations, the mixing of the plurality of carbon fiber filaments may result in the plurality of carbon fiber filaments being oriented substantially randomly within the molten pitch.

Once the plurality of carbon fiber filaments have been mixed in the molten pitch, the mixture of carbon fiber filaments and molten pitch may be deposited in a mold and cooled to form a carbon-carbon composite preform, which includes the molten pitch and plurality of carbon fiber filaments. In some examples, the carbon-carbon composite preform may be further processed, such as further densified, to form a final carbon-carbon composite material.

A carbon-carbon composite preform formed using the techniques described herein may provide advantages over a carbonized preform, e.g., in the context of forming a carbon-carbon composite part. For example, forming, in a single process, a carbon-carbon composite preform that includes a plurality of carbon fiber filaments mixed in pitch may eliminate a need to needle the carbon fiber precursor material and to carbonize the carbon fiber precursor material after forming a preform from a carbon fiber precursor material. The methods described herein also may reduce a number of subsequent densification steps required to achieve a given final density, e.g., compared to a process in which a preform is formed by needling together carbon fiber-precursor fabrics, carbonizing the carbon fiber-precursor fabric to form a carbonized preform, and then densifying the carbonized preform using pitch infiltration and/or CVD/CVI. A carbon-carbon composite preform formed using the techniques described herein also may be better able to withstand forces (e.g., shear forces) exerted on the carbon-carbon composite preform during subsequent processing compared to a carbonized preform. The forces may be applied to the carbon-carbon composite preform, for example, during densification, and may include relative high pressures or a relatively low vacuum.

Additionally or alternatively, examples of the techniques of this disclosure may allow mixing of a plurality of carbon fiber filaments in molten pitch without substantially affecting an average size of the plurality of carbon fiber filaments, e.g., without breaking substantially any of the plurality of carbon fiber filaments during the mixing process. Thus, the techniques described herein provide a technique for forming a robust preform that can be used to manufacture a carbon-carbon composite part.

FIG. 1 is a block diagram illustrating an example method of forming a carbon-carbon composite preform in accordance with aspects of the disclosure. The method includes defibrillating at least one carbon fiber to form a plurality of carbon fiber filaments (10). The carbon fiber filaments may be formed from one or more different precursor materials, for example, PAN, rayon, or pitch. The carbon fiber filaments may have different densities depending on which precursor material was used to form the carbon fiber filaments. In some examples, the density of the carbon fiber filaments may range between about 1.76 grams per cubic centimeter (g/cm$^3$) to about 1.9 g/cm$^3$.

In some examples, the plurality of carbon fiber filaments are provided, e.g., from a carbon fiber manufacturer, in a fibrillated state. For example, the plurality of carbon fiber filaments may be provided in the form of a yarn or tow including a plurality of carbon fiber filaments. In some examples, a tow of carbon fibers may include 1,000, 2,000, 3,000, 4,000 or more individual carbon fiber filaments per strand of tow. Defibrillation of the carbon fiber filaments may include separation of the yarn or tow into individual carbon fiber filaments or, in some cases, into bundles that have fewer carbon fiber filaments compared to the state prior to the defibrillation. Defibrillation may help improve the homogeneity (e.g., homogeneous distribution) of the carbon fiber filaments in the molten pitch.

In some examples, when defibrillation of the carbon fibers into a plurality of carbon fiber filaments is complete, substantially all or all of the carbon fiber filaments may be present as single filaments. Stated another way, substantially none or less than 5% of the carbon fiber filaments may be present in a bundle of multiple filaments weaved together.

In some examples, the carbon fibers may be defibrillated into a plurality of carbon fiber filaments in a mixer, such as a relatively low shear continuous mixer. Other relatively low shear paddle mixers (e.g., batch mixers or continuous mixers) or banbury-type mixers may also be used to defibrillate the carbon fibers into a plurality of carbon fiber filaments.

In some examples, defibrillating the carbon fibers into a plurality of carbon fiber filaments (10) may not break substantially any (e.g., none or nearly none) of the carbon fiber filaments. For example, in some implementations, an average length of the plurality of carbon fiber filaments may be substantially the same (e.g., the same or nearly the same, such as greater than about 80% of the original length or greater than about 90% of the original length) when the carbon fiber filaments are present in a tow and after defibrillation of the carbon fibers into individual carbon fiber filaments. For example, the average length of the carbon fiber filaments may be between about 6.35 millimeters (mm, about ¼ inch) and about 50.8 mm (about 2 inches) both before and after defibrillation. When the average length of the plurality of carbon fiber filaments is substantially unchanged by the defibrillation process, this may aid predicting of the properties of the final carbon-carbon composite friction material based on the properties of the starting materials, including the carbon fiber filaments.

In other examples, defibrillating the carbon fibers into a plurality of carbon fiber filaments (10) may break some of the carbon fiber filaments. In some examples, breaking the carbon fiber filaments may result in carbon fiber filaments with a range of lengths. The range of lengths may result in smaller carbon fiber filaments being disposed between larger carbon fiber filaments in the mixture and/or the carbon-carbon composite preform, which may result in the carbon-carbon composite preform possessing increased strength compared to a carbon-carbon composite preform that includes carbon fiber filaments of a substantially single length. In some examples, defibrillating the carbon fibers into a plurality of carbon fiber filaments (10) may break up to about 40% of the carbon fiber filaments, such as between about 30% and about 40% of the carbon fiber filaments.

The method also includes melting pitch to form molten pitch (12). The pitch may include, for example, at least one of isotropic pitch or mesophase pitch. The pitch may be at least one of petroleum pitch, coal tar pitch, or synthetic pitch. In some examples, the pitch may have a density between about 1.27 grams per cubic centimeter (g/cm$^3$) and about 1.33 g/cm$^3$. In some examples, the pitch may be melted (12) within the mixer in which the molten pitch and plurality of carbon fiber filaments will be mixed (14). In other examples, the pitch may be melted in a different apparatus and then, when in the molten state, be transferred to the mixer using any suitable technique. In some examples, melting pitch to form molten pitch (12) may include heating the pitch to a temperature above a softening temperature of the pitch, which may be between about 110° C. and about 350° C. for some pitches.

Once the pitch is melted (12), the plurality of carbon fiber filaments and the molten pitch are mixed (14). In some examples, the mixer in which the plurality of carbon fiber filaments and molten pitch are mixed may be a relatively low shear continuous mixer. Other relatively low shear paddle mixers (e.g., batch mixers or continuous mixers) or banbury-type mixers may also be used to defibrillate the carbon fibers into a plurality of carbon fiber filaments. Mixing the plurality of carbon fiber filaments in molten pitch (14) using a relatively low shear mixer may, in some examples, allow mixing of the filaments and molten pitch without breaking substantially any of the carbon fiber filaments. For example, in some implementations, an average length of the plurality of carbon fiber filaments may be substantially the same (e.g., the same or nearly the same, such as greater than about 80% of the original length or greater than about 90% of the original length prior to the mixing with the pitch) before being mixed in molten pitch and after the mixing step (14) is complete. For example, the average length of the carbon fiber filaments before mixing may be between about 6.35 millimeters (mm, about ¼ inch) and about 50.8 mm (about 2 inches). Continuing this example, the average length of the carbon fiber filaments after mixing may be between about 6.35 mm (about ¼ inch) and about 50.8 mm (about 2 inches). When the average length of the plurality of carbon fiber filaments is substantially unchanged by the mixing process, this may aid predicting of the properties of the final carbon-carbon composite friction material based on the properties of the starting materials, including the carbon fiber filaments.

In other examples, mixing the plurality of carbon fiber filaments in molten pitch (14) may break some of the carbon fiber filaments. In some examples, breaking the carbon fiber filaments may result in carbon fiber filaments with a range of lengths. The range of lengths may result in smaller carbon fiber filaments being disposed between larger carbon fiber filaments in the mixture and/or the carbon-carbon composite preform, which may result in the carbon-carbon composite preform possessing increased strength compared to a carbon-carbon composite preform that includes carbon fiber filaments of a substantially single length. In some examples, mixing the plurality of carbon fiber filaments in molten pitch (14) may break up to about 40% of the carbon fibers filaments, such as between about 30% and about 40% of the carbon fiber filaments.

In some examples, the plurality of carbon fiber filaments may be mixed into the molten pitch to a volume fraction of between about 15 volume percent (vol. % (volume of carbon fiber filaments compared to total volume of the mixture)) and about 30 vol. %. For example, the plurality of carbon fiber filaments may constitute between about 20 vol. % and about 25 vol. % of the mixture, or about 25 vol. % of the mixture.

Mixing the plurality of carbon fiber filaments and molten pitch (14) may continue until the mixture of carbon fiber filaments and molten pitch is substantially homogeneous, e.g., until the carbon fiber filaments are substantially homogeneously distributed throughout the molten pitch. Whether the mixture is substantially homogeneously may be determined experimentally. For example, homogeneity of the mixture may be determined by sampling a portion of the mixture or the carbon-carbon composite preform and analyzing a section of the mixture or the carbon-carbon composite preform whether the carbon fiber filaments are distributed substantially evenly within the pitch. In some examples, the substantially homogeneous mixture of carbon fiber filaments and molten pitch may have a density between about 1.3 g/cm$^3$ and about 1.4 g/cm$^3$. Additionally or alternatively, the plurality of carbon fiber filaments may be substantially randomly oriented within the molten pitch when the mixing is complete.

In some examples, the method shown in FIG. 1 includes mixing at least one additive in the molten pitch (16). The at least one additive may modify one or more properties of the molten pitch, the plurality of carbon fiber filaments, and/or the carbon-carbon composite preform formed from the mixture of the molten pitch and the plurality of carbon fiber filaments. In some examples, the at least one additive includes a friction modifier, such as titanium (Ti) or silica (SiO$_2$). In some examples, the at least one additive additionally or alternatively includes an oxidizer, such as a peroxide. An oxidizer may stabilize synthetic pitch, and may reduce or eliminate the need for a subsequent oxidation step to stabilize a carbon-carbon composite preform formed with synthetic pitch.

In some examples, the at least one additive may be mixed into the molten pitch to a concentration of less than about 10 weight percent (wt. %), such as between about 1 wt. % and about 10 wt. % (based on the total mixture, including the molten pitch, at least one additive, and plurality of carbon fiber filaments). In some examples, the friction modifier may be mixed into the molten pitch to a concentration of less than about 10 wt. %, such as between about 1 wt. % and about 10 wt. %. In some examples, the oxidizer may be mixed into the molten pitch to a concentration of less than about 10 wt. %, such as between about 1 wt. % and about 10 wt. %.

In some implementations, the at least one additive may be mixed into the molten pitch (16) in the same step as the plurality of carbon fiber filaments (14), e.g., the at least one additive may be deposited in the molten pitch substantially simultaneously with the plurality of carbon fiber filaments. In other implementations, the at least one additive may be mixed into the molten pitch (16) using the same mixing apparatus as the apparatus used for mixing the plurality of carbon fiber filaments in the molten pitch (16), but the at least one additive may be deposited in the molten pitch before and/or after the plurality of carbon fiber filaments are deposited in the molten pitch. In other implementations, the at least one additive may be mixed into the molten pitch (16) in a different apparatus than the apparatus used for mixing the plurality of carbon fiber filaments into the molten pitch (14). Additionally, in examples in which more than one additive is mixed into the molten pitch, the additives may be mixed into the molten pitch at substantially the same time or at different times, and/or may be mixed into the molten pitch using the same or different apparatuses.

In some examples, the at least one additive may be mixed in the molten pitch (16) until it is mixed substantially homogenously in the molten pitch. In some of these examples, mixing the at least one additive substantially homogeneously in the molten pitch may result in the properties provided by the at least one additive being attributed to the whole mixture. In other examples, the at least one additive may not be homogeneously mixed in the molten pitch. In some of these examples, mixing the at least one additive non-uniformly throughout the molten pitch may result in the properties provided by the at least one additive not being attributed to the whole mixture. In some cases, this may be desirable. For example, in some cases, it may be desirable for an anti-oxidant additive to be present on a friction surface of a brake disc, but may desirable for an anti-oxidant additive to be present within an interior of the brake disc.

Figure 2:
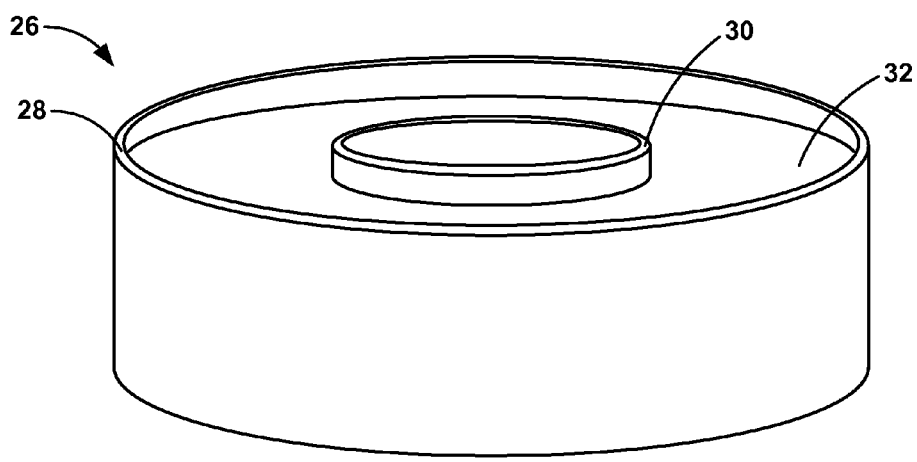
FIG. 2 is a conceptual diagram of a mixture of molten pitch and a plurality of carbon fiber filaments disposed in a mold.

Once the substantially homogeneous mixture of a plurality of defibrillated carbon fiber filaments, molten pitch, and, optionally at least one additive (hereinafter, "the mixture") has been formed, the mixture may be deposited within a mold (18). FIG. 2 is a conceptual diagram that illustrates one example of a mixture 32 deposited in a mold 26. In the example of FIG. 2, mold 26 defines an annulus between an outer wall 28 and an inner wall 30. Mixture 32 is disposed in the annulus between outer wall 28 and inner wall 30. Although the example of FIG. 2 illustrates an annular mold 26, in other examples, mold 26 may define other shapes, such as squares, rectangles, ellipses, or other, more complex shapes.

Mold 26 may be configured in a shape that is close to a desired shape of the carbon-carbon composite friction material. In this way, mold 26 may produce a carbon-carbon composite preform with a near-net shape.

In some examples, the mixture may be transferred to or deposited in an accumulator prior to being placed in mold 26. The mixture may be held within the accumulator until a predetermined amount of the mixture has accumulated, after which, the mixture may be transferred to or deposited in mold 26. In some examples, the mixture may be transferred to or deposited in mold 26 using a process that results in substantially random orientation of the plurality of carbon fiber filaments within the mixture when the mixture is in mold 26. An example of a process than may result in substantially random orientation of the plurality of carbon fiber filaments may include depositing the mixture directly from the mixer to the compression mold without use of a pressure ram or nozzle.

In some examples, the mixture may be transferred to mold 26 using an injection molding process. In some implementations, injection molding the mixture may orient at least some of the plurality of carbon fiber filaments in a direction of the flow of the mixture into mold 26. This may be advantageous in some examples in order to control the properties of the carbon-carbon composite preform (and potentially the carbon-carbon composite friction material) based on the orientation of the plurality of carbon fiber filaments. For example, a nozzle used for the injection molding can be oriented such that the direction the mixture is transferred into the mold helps orient the carbon fiber filaments in a z-axis direction (e.g., in a direction of the thickness of a carbon-carbon composite brake disc).

Once the mixture has been transferred to or deposited in mold 26, the mixture may be cooled to form the carbon-carbon composite preform (20). The cooling rate may be selected to not result in formation of significant defects (e.g., defects that negatively affect the structural integrity of the carbon-carbon composite preform) in the carbon-carbon composite preform as a result of cooling the preform. In some examples, the cooling process may result in formation of some cracks or porosity in the carbon-carbon composite preform. This may be desirable in some examples, as it may facilitate densification of the carbon-carbon composite preform in subsequent processing. As described above, the carbon-carbon composite preform includes the plurality of carbon fiber filaments, pitch, and any additives that were added to the mixture. In some examples, the carbon-carbon composite preform may be near-net shape (e.g., close to a final shape of the carbon-carbon friction material) upon cooling and removal from mold 26.

The carbon-carbon composite preform can be further processed in some examples, e.g., in order to form a carbon-carbon composite brake disc for use in the aerospace industry. In some examples, the method shown in FIG. 1 may optionally include heating the carbon-carbon composite preform to carbonize the pitch (22). For example, the carbon-carbon composite preform may be heated to a temperature between about 600° C. and about 1200° C. to carbonize the pitch. The carbon-carbon composite preform may be heated in a retort under inert or reducing conditions to remove the non-carbon constituents (hydrogen, nitrogen, oxygen, etc.) from the preforms. In some examples, carbonization can be carried out either in a furnace, a hot isostatic press, an autoclave, or in a uniaxial hot press. In one example, for instance, the retort may be purged gently with nitrogen for approximately 1 hour, then it is heated to about 900° C. (e.g., at or around 900° C.). in about 10 to about 20 hours, and then to about 1050° C. (e.g., at or around 1050° C.). in about 1 hour to about 2 hours. The retort may be held at 1050° C. for about 3 to about 6 hours, then allowed to cool overnight.

Once the pitch in the carbon-carbon composite preform has been carbonized (22), the carbon-carbon composite preform may be subjected to at least one densification step (24). The at least one densification step may be performed using one or more of, for example, vacuum pressure infiltration ("VPI"), resin transfer molding ("RTM"), and/or CVD/CVI. It can be desirable to densify the carbon-carbon composite body in order improve the thermal conductivity of the body; in some cases, as the density of the carbon-carbon composite body increases, the better it conducts heat, and the better it acts as a heat sink. In some examples, the carbon-carbon composite preform may be subjected to a sufficient number of densification steps to result in a final density between about 1.5 g/cm$^3$ and about 1.85 g/cm$^3$.

In some examples of VPI, the carbon-carbon composite preform is heated under inert conditions to well above the melting point of the impregnating pitch. Then, gas in the pores of the carbon-carbon composite preform is removed by evacuating the preform. Finally, molten pitch is allowed to infiltrate the pores of the preform, as the overall pressure is returned to one atmosphere or above. In the VPI process, a volume of resin or pitch is melted in one vessel while the porous carbon-carbon composite preform is contained in a second vessel under vacuum. The molten resin or pitch is transferred from vessel one into the porous preforms contained in the second vessel using a combination of vacuum and pressure. The VPI process typically employs resin and pitches which possess low to medium viscosity. Such pitches may provide lower carbon yields than mesophase pitches.

In some examples of RTM, the carbon-carbon composite preform is placed into a mold matching the desired part geometry. Typically, a relatively low viscosity thermoset resin is injected at low temperature (50° C. to 150° C.) using pressure or induced under vacuum, into the porous carbon-carbon composite preform contained within a mold. The resin is cured within the mold before being removed from the mold. U.S. Pat. No. 6,537,470 B1 (Wood et al.) describes a more flexible RTM process that can make use of high viscosity resin or pitch. The entire disclosure of U.S. Pat. No. 6,537,470 B1 is incorporated herein by reference.

In some examples of CVD/CVI, the carbon-carbon composite preform is heated in a retort under the cover of inert gas, such as at a pressure below 100 torr. When the carbon-carbon composite preform reaches a temperature between about 900° C. and about 1200° C., the inert gas is replaced with a carbon-bearing gas such as natural gas, methane, ethane, propane, butane, propylene, or acetylene, or a combination of at least two of these gases. When the carbon-bearing gas flows around and through the carbon-carbon composite preform, a complex set of dehydrogenation, condensation, and polymerization reactions occur, thereby depositing the carbon atoms within the interior and onto the surface of the carbon-carbon composite preform. Over time, as more and more of the carbon atoms are deposited onto the surfaces of pores in the carbon-carbon composite preform, the carbon-carbon composite preform becomes more dense. This process is sometimes referred to as densification, because the open spaces in the carbon-carbon composite preform are eventually filled with a carbon matrix until generally solid carbon parts are formed. Depending upon the pressure, temperature, and gas composition, the crystallographic structure and order of the deposited carbon can be controlled, yielding anything from an isotropic carbon to a highly anisotropic, ordered carbon. U.S. Patent Application Publication No. 2006/0046059 (Arico et al.), the entire disclosure of which is incorporated herein by reference, provides an overview of CVD/CVI processing.

Various examples have been described. These and other examples are within the scope of the following claims.

The invention claimed is:

1. A method comprising:
defibrillating at least one carbon fiber to form a plurality of carbon fiber filaments;
melting pitch to form molten pitch; and
mixing the plurality of carbon fiber filaments and the molten pitch to form a substantially homogeneous mixture of carbon fiber filaments and molten pitch.

2. The method of claim 1, further comprising:
depositing the substantially homogeneous mixture of carbon fiber filaments and molten pitch in a mold; and
cooling the substantially homogeneous mixture of carbon fiber filaments and molten pitch to form a carbon-carbon composite preform.

3. The method of claim 2, wherein depositing the substantially homogeneous mixture in the mold comprises injection molding the substantially homogeneous mixture into the mold.

4. The method of claim 1, wherein melting pitch to form molten pitch comprises melting at least one of isotropic pitch or mesophase pitch to form molten pitch.

5. The method of claim 1, wherein melting pitch to form molten pitch comprises melting at least one of petroleum pitch, coal tar pitch, or synthetic pitch to form molten pitch.

6. The method of claim 1, wherein mixing the plurality of carbon fiber filaments and the molten pitch comprises mixing the plurality of carbon fiber filaments comprising an average density between about 1.76 g/cm$^3$ and about 1.9 g/cm$^3$ with molten pitch comprising an average density between about 1.27 and about 1.33 g/cm³ to form the substantially homogeneous mixture comprising an average density of between about 1.3 g/cm³ and about 1.4 g/cm³.

7. The method of claim 1, wherein mixing the plurality of carbon fiber filaments and the molten pitch comprises mixing the plurality of carbon fiber filaments and the molten pitch to a volume fraction of carbon fiber filaments between about 15 volume percent (vol. %) and about 30 vol. %.

8. The method of claim 1, further comprising mixing at least one of titanium, silica, a phosphate, or an oxidizer within the molten pitch.

9. The method of claim 1, wherein mixing the plurality of carbon fiber filaments and the molten pitch comprises mixing the plurality of carbon fiber filaments having a length between about 6.35 millimeters and about 50.8 millimeters and the molten pitch to form the substantially homogeneous mixture of carbon fiber filaments and molten pitch, wherein mixing the plurality of carbon fiber filaments does not substantially change an average length of the plurality of carbon fiber filaments.

10. A method comprising mixing a plurality of carbon fiber filaments having a length between about 6.35 millimeters and about 50.8 millimeters in molten pitch to form a substantially homogeneous mixture of carbon fiber filaments within the molten pitch, wherein mixing the plurality of carbon fiber filaments does not substantially change an average length of the plurality of carbon fiber filaments.

11. The method of claim 10, further comprising:
depositing the substantially homogeneous mixture within a mold; and
cooling the substantially homogeneous mixture to solidify the molten pitch and form a carbon-carbon composite preform.

12. The method of claim 11, wherein depositing the substantially homogeneous mixture in the mold comprises injection molding the substantially homogeneous mixture into the mold.

13. The method of claim 11, wherein mixing the plurality of carbon fiber filaments having the length between about 6.35 millimeters and about 50.8 millimeters in molten pitch comprises mixing the plurality of carbon fiber filaments having the length between about 6.35 millimeters and about 50.8 millimeters in at least one of molten isotropic pitch or molten mesophase pitch.

14. The method of claim 11, wherein mixing the plurality of carbon fiber filaments having the length between about 6.35 millimeters and about 50.8 millimeters in molten pitch comprises mixing the plurality of carbon fiber filaments having the length between about 6.35 millimeters and about 50.8 millimeters in at least one of molten petroleum pitch, molten coal tar pitch, or molten synthetic pitch.

15. The method of claim 11, wherein mixing the plurality of carbon fiber filaments having the length between about 6.35 millimeters and about 50.8 millimeters in molten pitch comprises mixing a plurality of carbon fiber filaments comprising an average density between about 1.76 g/cm³ and about 1.9 g/cm³ with molten pitch comprising an average density between about 1.27 and about 1.33 g/cm³ to form a substantially homogeneous mixture comprising an average density of between about 1.3 g/cm³ and about 1.4 g/cm³.

16. The method of claim 11, wherein mixing the plurality of carbon fibers filaments having the length between about 6.35 millimeters and about 50.8 millimeters in molten pitch comprises mixing the plurality of carbon fiber filaments and the molten pitch to a volume fraction of carbon fiber filaments between about 15 vol. % and about 30 vol. %.

17. The method of claim 11, further comprising mixing at least one of titanium, silica, a phosphate, or an oxidizer within the molten pitch.

18. A system comprising:
a mold; and
a substantially homogeneous mixture disposed in the mold, wherein the substantially homogeneous mixture comprises molten pitch and a plurality of substantially fully defibrillated carbon fiber filaments.

19. The system of claim 18, wherein the substantially homogeneous mixture is essentially free of fibrillated carbon fibers.

20. The system of claim 18, wherein the mold defines a near-net shape.

\* \* \* \* \*